Dec. 28, 1948.                L. R. BECKMAN                2,457,435
                         AUTOMOBILE CHAIN SNAP
                         Filed March 28, 1947
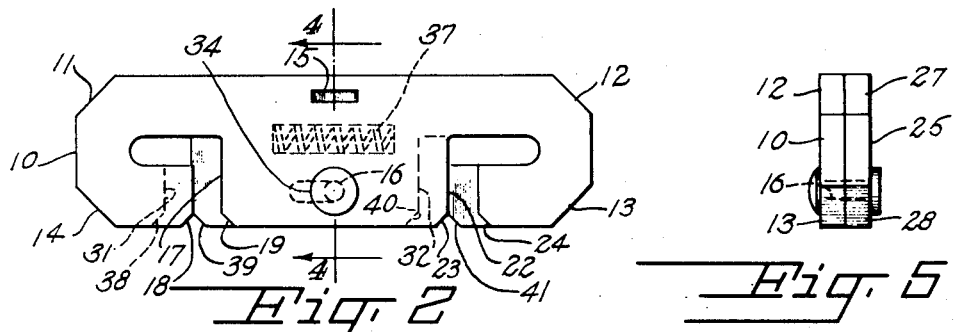
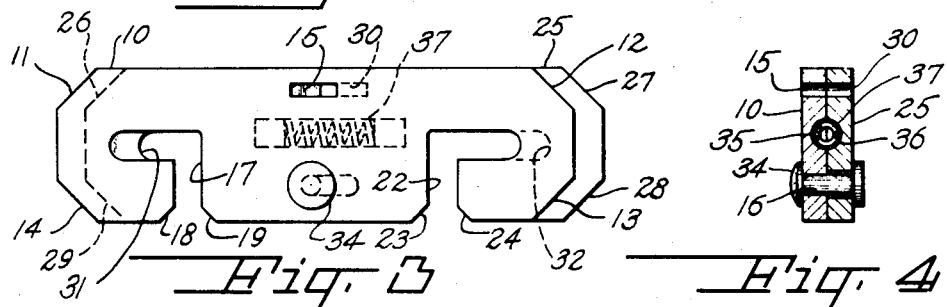
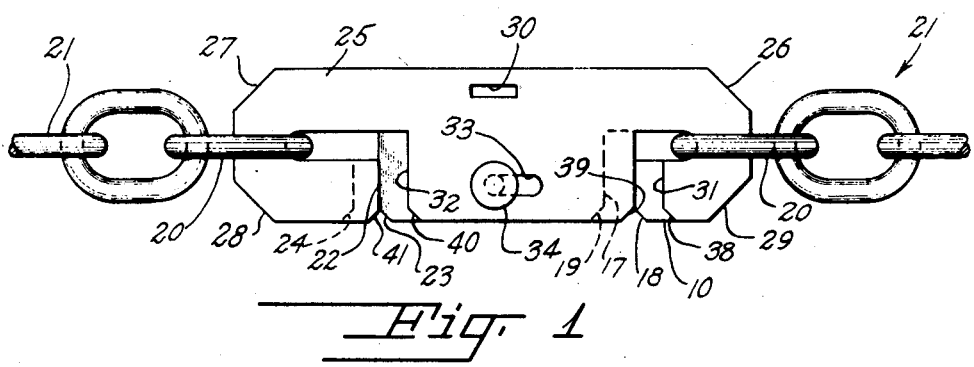
Inventor
Lawrence R. Beckman
By
McMorrow, Berman & Davidson
Attorneys Patented Dec. 28, 1948

2,457,435

UNITED STATES PATENT OFFICE 2,457,435

AUTOMOBILE CHAIN SNAP

Lawrence R. Beckman, Erhard, Minn.

Application March 28, 1947, Serial No. 737,872

5 Claims. (Cl. 24—73)

My invention relates to automobile accessories and more particularly to a snap adapted to connect the ends of an automobile mud chain with each other.

The object of my invention is to provide an automobile chain snap adapted to receive and hold the end links of an automobile mud chain, so that the ends of said chain are securely but disengageably connected with each other.

Other objects of my invention may appear in the following specification describing it with reference to the accompanying drawing illustrating a preferred embodiment of my invention.

It is however to be understood, that my invention is not to be limited or restricted to the exact construction and combination of parts described in the specification and shown in the drawing, but that such changes and modifications can be made, which fall within the scope of the claims appended hereto.

In the drawing

Figure 1 is an elevational rear view of an automobile chain snap according to my invention in working position connecting the ends of a fragmentarily shown chain.

Figure 2 is an elevational front view of an automobile chain snap in closed position.

Figure 3 is an elevational front view of an automobile chain snap in open position, ready to receive the end links of an auto chain or the like.

Figure 4 is a sectional view taken on line 4—4 in Figure 2, and

Figure 5 is an end view of Figure 2.

Referring now in detail to the drawing the automobile chain snap forming the subject matter of my invention comprises a front plate 10 made preferably from any suitable metal and having a substantially rectangular shape, the corners of said rectangle being broken as shown at 11, 12, 13 and 14.

Centrally of the length of the front plate 10 and adjacent the upper edge thereof a small rectangular hole 15 is provided and extends lengthwise thereto.

Adjacent the lower edge of the front plate 10 a round hole 16 is arranged on the transverse center line of said front plate.

Between the left hand end of the front plate 10 and its transverse center line a hook shaped slot 17 extends upwardly from the lower edge of said plate 10 and then horizontally toward the left. The lower corners of the slot 17 are broken as shown at 18 and 19. The slot is wide enough to receive a link 20 of a chain 21 therein and the horizontal portion of the hook shaped slot 17 is arranged symmetrically about the longitudinal center line of the front plate 10.

A second hook shaped slot 22 is arranged at the right from the transverse center line of the front plate 10 at an equal distance from said center line as the first mentioned hook slot 17. The second hook slot 22 extends upwardly from the lower edge of the front plate 10 as far as the first hook slot 17 and extends then toward the right. The width of the second hook slot is equal to the width of the first hook slot and the corners of the second hook slot 22 are broken as shown at 23 and 24.

A rear plate 25 is as long and as wide as the front plate 10 and its corners are broken as shown at 26, 27, 28 and 29.

A rectangular longitudinal slot 30 is provided in the rear plate 25 and is located, so that it coincides with the slot 15 in the front plate 10, when the two plates are arranged relatively to each other so that they cover each other.

To the left of the transverse center line of the rear plate 25 another hook slot 31 is provided. The width of this hook slot is equal to the width of the first named hook slot 17 in the front plate 10. The portion of the third hook slot 31 extending upwardly from the lower edge of the rear plate 25 is located so that its inner edge coincides with the outer edge of the first hook slot 17, when the two plates are arranged to cover each other. The horizontal portion of the third hook slot 31 coincides with the corresponding portion of the first hook slot 17 but is shorter than this last mentioned portion of first hook slot 17. The difference of the lengths of the two horizontal hook slot portions is equal to the width of said slots.

To the right of the transverse center line of the rear plate 25 a fourth hook slot 32 is provided, having a portion extending upwardly from the lower edge of the rear plate 25. The width of this hook slot portion is equal to the width of the corresponding portion of the second hook slot 22 in the front plate 10, and the outer edge of this slot portion coincides with the inner edge of the corresponding portion of slot 22, when the plates cover each other.

The horizontal portion of the fourth hook slot 32 coincides with the corresponding portion of the second hook slot 22 but is longer than this hook slot portion. The difference in length between these two hook slot portions is equal to the width of said slots.

In the rear plate 25, Figure 1, an elongated hole 33 is provided, so that its left end coincides with the hole 16 in the front plate 10 and its right end extends beyond said hole a distance equal to the width of the hook slot, when the two plates 10 and 25 are arranged to cover each other.

A rivet 34 extends through the hole 16 in the front plate 10 and the elongated hole 33 in the rear plate 25 connecting these two plates securely with each other, but permitting longitudinal sliding movement of said plates relative to each other.

In the rear surface of the front plate 10 a horizontal groove 35 is provided between the hole 16 and the rectangular opening 15. This groove has a semi-circular cross section, and in the front surface of the rear plate 25 a corresponding groove 36 is arranged, so that a helical spring 37 can be positioned into these grooves, when the two plates 10 and 25 are being connected with each other. The ends of the helical spring 37 engage the ends of the two grooves 35 and 36 and urge the plates 10 and 25 to slide into and remain in the position shown in Figures 1 and 2. In this position the two plates cover each other and the hook slots in these plates are arranged so that the vertical or entrance portions of said slots are closed.

When it is desired to insert links 20 of the chain 21 into the hook slots, the plates 10 and 25 are slid into the position shown in Figure 3, so that the vertical slot portions coincide with each other permitting the links 20 to enter into the horizontal slot portions. When the finger pressure on the plates is released, the spring urges the plates into the position shown in Figure 1 in which the links are securely held against accidental displacement.

To facilitate the insertion of the links 20 into the slots, the lower edges of the slots 31 and 32 in the rear plate 25 are also broken as shown at 38, 39, 40 and 41.

When snow, ice, mud or the like prevents easy sliding movement of the plates 10 and 25 relative to each other a screw driver or the like (not shown) is inserted into the rectangular openings 15 and 30 in the front and rear plate respectively and sliding movement of said plates is obtained therewith.

Having described my invention, I claim as new and desire to secure by Letters Patent:

1. An automobile chain snap including a substantially rectangular front plate provided with two hook shaped slots adjacent its ends, the vertical portion of each slot extending in the same direction and the horizontal slot portions extending in opposite directions, a rear plate having the same size and shape as the front plate and provided with two hook slots of the same width as the slots in the front plate, the two plates being slidably connected with each other, the vertical slot portions in the rear plate being located so that the inner edge of one of said slot portions coincides with the outer edge of the corresponding slot portion in the front plate and the outer edge of the other vertical slot portion in the rear plate coincides with the inner edge of the corresponding slot portion in the front plate, when the two plates are arranged to cover each other.

2. An automobile chain snap including a substantially rectangular front plate provided with two hook shaped slots adjacent its ends, the vertical portion of each slot extending in the same direction and the horizontal slot portions extending in opposite directions, a rear plate having the same size and shape as the front plate and provided with two hook slots of the same width as the slots in the front plate, the two plates being slidably connected with each other, the vertical slot portions in the rear plate being located so that the inner edge of one of said slot portions coincides with the outer edge of the corresponding slot portion in the front plate and the outer edge of the other vertical slot portion in the rear plate coincides with the inner edge of the corresponding slot portion in the front plate, when the two plates are arranged to cover each other, the horizontal portion of the first slot in the rear plate being shorter than the corresponding slot portion in the front plate and the horizonal portion of the second slot in the rear plate being longer than the corresponding slot portion in the front plate.

3. An automobile chain snap including a substantially rectangular front plate provided with two hook shaped slots adjacent its ends, the vertical portion of each slot extending in the same direction and the horizontal slot portions extending in opposite directions, a rear plate having the same size and shape as the front plate and provided with two hook slots of the same width as the slots in the front plate, the two plates being slidably connected with each other, the vertical slot portions in the rear plate being located so that the inner edge of one of said slot portions coincides with the outer edge of the corresponding slot portion in the front plate and the outer edge of the other vertical slot portion in the rear plate coincides with the inner edge of the corresponding slot portion in the front plate, when the two plates are arranged to cover each other, the horizontal portion of the first slot in the rear plate being shorter than the corresponding slot portion in the front plate and the horizontal portion of the second slot in the rear plate being longer than the corresponding slot portion in the front plate, the difference in the length of said corresponding slot portions being equal to the width of said slots.

4. An automobile chain snap including a substantially rectangular front plate provided with two hook shaped slots adjacent its ends, the vertical portion of each slot extending in the same direction and the horizontal slot portions extending in opposite directions, a rear plate having the same size and shape as the front plate and provided with two hook slots of the same width as the slots in the front plate, the two plates being slidably connected with each other, the vertical slot portions in the rear plate being located so that the inner edge of one of said slot portions coincides with the outer edge of the corresponding slot portion in the front plate and the outer edge of the other vertical slot portion in the rear plate coincides with the inner edge of the corresponding slot portion in the front plate, when the two plates are arranged to cover each other, the horizontal portion of the first slot in the rear plate being shorter than the corresponding slot portion in the front plate and the horizontal portion of the second slot in the rear plate being longer than the corresponding slot portion in the front plate, the difference in the length of said corresponding slot portions being equal to the width of said slots, and a spring engaging the two plates and urging them into position to cover each other.

5. An automobile chain snap including a substantially rectangular front plate provided with two hook shaped slots adjacent its ends, the vertical portion of each slot extending in the same direction and the horizontal slot portions extending in opposite directions, a rear plate having the same size and shape as the front plate and provided with two hook slots of the same width as the slots in the front plate, the two plates being slidably connected with each other, the vertical slot portions in the rear plate being located so that the inner edge of one of said slot portions coincides with the outer edge of the corresponding slot portion in the front plate and the outer edge of the other vertical slot portion in the rear plate coincides with the inner edge of the corresponding slot portion in the front plate, when the two plates are arranged to cover each other, the horizontal portion of the first slot in the rear plate being shorter than the corresponding slot portion in the front plate and the horizontal portion of the second slot in the rear plate being longer than the corresponding slot portion in the front plate, the difference in the length of said corresponding slot portions being equal to the width of said slots, the front plate being provided with a longitudinal groove in its rear surface, the rear plate having a corresponding groove in its front surface and a helical spring located in said grooves, engaging the ends of said grooves and urging the plates in position to cover each other.

LAWRENCE R. BECKMAN.

No references cited.